US011921962B2

(12) United States Patent
Goto

(10) Patent No.: US 11,921,962 B2
(45) Date of Patent: Mar. 5, 2024

(54) SENSOR MODULE AND TOUCH PANEL WITH FIRST SENSOR ARRAY TO DETECT NON-CONTACT TOUCH AND SECOND SENSOR ARRAY TO DETECT CONTACTING TOUCH

(71) Applicant: Japan Display Inc., Tokyo (JP)

(72) Inventor: Naoshi Goto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/704,331

(22) Filed: Mar. 25, 2022

(65) Prior Publication Data
US 2022/0308703 A1    Sep. 29, 2022

(30) Foreign Application Priority Data

Mar. 29, 2021 (JP) .................. 2021-056074

(51) Int. Cl.
   *G06F 3/044* (2006.01)
(52) U.S. Cl.
   CPC .......... *G06F 3/0446* (2019.05); *G06F 3/0445* (2019.05); *G06F 3/0448* (2019.05); *G06F 2203/04107* (2013.01); *G06F 2203/04108* (2013.01)
(58) Field of Classification Search
   CPC .... G06F 3/0446; G06F 3/0445; G06F 3/0448; G06F 2203/04107; G06F 2203/04108
   See application file for complete search history.

(56) References Cited

U.S. PATENT DOCUMENTS

| 2009/0273573 | A1* | 11/2009 | Hotelling | G06F 3/0362 |
| | | | | 345/173 |
| 2014/0036166 | A1* | 2/2014 | Kurasawa | G06F 3/0416 |
| | | | | 349/12 |
| 2016/0077655 | A1* | 3/2016 | Oda | G06F 3/04166 |
| | | | | 345/174 |
| 2016/0209963 | A1* | 7/2016 | Chang | G06F 3/04166 |
| 2019/0102010 | A1* | 4/2019 | Knabenshue | G06F 3/0442 |
| 2020/0363906 | A1* | 11/2020 | Kono | G06F 3/0445 |

FOREIGN PATENT DOCUMENTS

JP    2018-097820 A    6/2018

* cited by examiner

*Primary Examiner* — Liliana Cerullo
(74) *Attorney, Agent, or Firm* — K&L Gates LLP

(57) ABSTRACT

A sensor module according to an embodiment includes a cover member, a first sensor array overlapping the cover member, the first sensor array including a plurality of first sensor electrodes, the first sensor array being a non-contact type, a control unit receiving a detection signal output from the first sensor array and generating coordinate information based on the detection signal, a drive unit receiving the coordinate information from the control unit and outputting a drive signal based on the coordinate information, and a drive electrode array overlapping the first sensor array, the drive electrode array being driven based on the drive signal.

4 Claims, 7 Drawing Sheets

SENSOR MODULE AND TOUCH PANEL WITH FIRST SENSOR ARRAY TO DETECT NON-CONTACT TOUCH AND SECOND SENSOR ARRAY TO DETECT CONTACTING TOUCH

CROSS-REFERENCE TO RELATED APPLICATIONS

This application is based upon and claims the benefit of priority from the prior Japanese Patent Application No. 2021-056074, filed on Mar. 29, 2021, the entire contents of which are incorporated herein by reference.

FIELD

An embodiment of the present disclosure relates to a sensor module and a touch panel with the sensor module. Particularly, it relates to a sensor module with a hover sensor and a touch panel with the hover sensor.

BACKGROUND

Traditionally, a touch panel with a touch sensor on a display panel such as a liquid crystal panel has been put into practical use. The touch panel can be operated by touching the surface of the touch panel with a finger, a pen, or the like. The touch panel is mounted on an ATM (automatic teller machine), an automated checkout machine, a ticket vending machine, or the like. When the touch panel is operated with a finger, an unspecified number of users directly touch the touch panel with a fingertip. Therefore, a hygiene issue, which causes an infection including bacteria and viruses by the direct contact of the touch panel, may occur.

In order to solve such a problem, for example, Japanese Laid-Open Patent No. 2018-97820 discloses a touch panel system that detects a touch position with appropriate accuracy in a touch panel that receives an input by a finger and a pen.

SUMMARY

A sensor module according to an embodiment includes a cover member, a first sensor array overlapping the cover member, the first sensor array including a plurality of first sensor electrodes, the first sensor array being a non-contact type, a control unit receiving a detection signal output from the first sensor array and generating coordinate information based on the detection signal, a drive unit receiving the coordinate information from the control unit and outputting a drive signal based on the coordinate information, and a drive electrode array overlapping the first sensor array, the drive electrode array being driven based on the drive signal.

A touch panel according to an embodiment includes a first sensor module, a second sensor module overlapping the first sensor module, the first sensor module includes a cover member, a first sensor array overlapping the cover member, the first sensor array including a first detection area equipped with a plurality of first sensor electrodes, the first sensor array being a non-contact type, a control unit receiving a first detection signal output from the first sensor array and generating coordinate information based on the first detection signal, a drive unit receiving the coordinate information from the control unit and outputting a drive signal based on the coordinate information, and a drive electrode array being driven based on the drive signal, the second sensor module includes a second sensor array including a second detection area, the second detection area being arranged to overlap the first detection area via the drive electrode array, the second detection area being equipped with a plurality of second sensor electrodes, the second sensor array identifying a position corresponding to the coordinate information in the second detection area based on the drive signal supplied to the drive electrode array.

DESCRIPTION OF EMBODIMENTS

Figure 1:
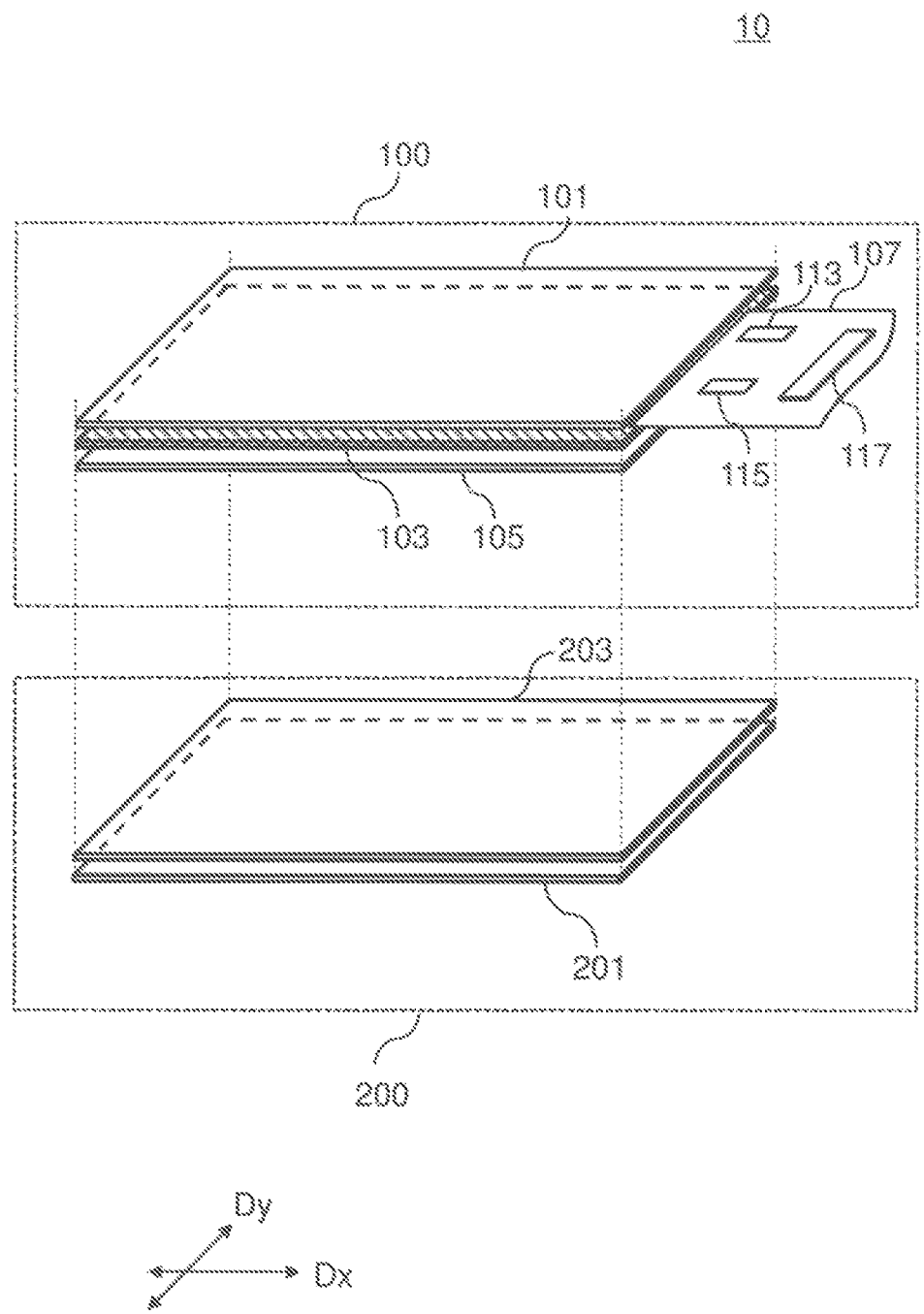
FIG. 1 is a schematic view showing an example of a configuration of a touch panel according to an embodiment.

Embodiments of the present disclosure will be described below with reference to the drawings and the like. However, the present disclosure may be implemented in various modes without departing from the gist thereof. The present disclosure is not to be construed as being limited to the description of the following exemplary embodiments. For the sake of clarity of description, the drawings may be schematically represented with respect to widths, thicknesses, shapes, and the like of the respective portions in comparison with actual embodiments. However, the drawings are merely examples and are not intended to limit the interpretation of the present disclosure.

In describing embodiments of the present disclosure, the phrases "above" or "below" merely describe the relative positional relationship of the elements. For example, the expression that a first component is arranged "above" a second component includes not only the case where the first component is "directly on" the second component, but also the case where another component is interposed between the first component and the second component. Furthermore, the terms "above" or "below" include not only the case where the elements overlap but also the case where they do not overlap in a plan view.

In this specification, the expressions "α includes A, B, or C", "α includes any of A, B, and C", and "α includes one selected from a group consisting of A, B, and C" do not exclude the case where a includes multiple combinations of A to C unless otherwise specified. Furthermore, these expressions do not exclude the case where a includes other elements.

In describing the embodiments of the present disclosure, elements having the same functions as those of the elements already described may be denoted by the same symbols or the same symbols with symbols such as alphabets, and a description thereof may be omitted. For example, in the case where there is a plurality of elements to which a certain symbol is attached in the drawings, the elements may be distinguished by attaching symbols "a", "b" and the like to the respective elements. On the other hand, when it is not necessary to distinguish each element, only the symbol indicating the element will be used.

It is an object of an embodiment of the present disclosure to provide a non-contact type touch panel that can be easily applied to an existing system.

In the embodiment shown below, a configuration of a touch panel according to an embodiment of the present disclosure will be exemplified.

[Configuration of Touch Panel]

A configuration of a touch panel 10 according to an embodiment of the present disclosure will be described with reference to FIG. 1.

FIG. 1 is a schematic view showing an example of a configuration of the touch panel 10 according to an embodiment of the present disclosure. As shown in FIG. 1, the touch panel 10 includes a first sensor module 100, and a second sensor module 200.

Hereinafter, a configuration of the first sensor module 100 will be described with reference to FIG. 1 to FIG. 6. As shown in FIG. 1, the first sensor module 100 includes a cover member 101, a first sensor array 103, a drive electrode array 105, a circuit substrate 107, a first IC element 113, a second IC element 115, and a third IC element 117.

The cover member 101 may be a glass substrate. However, the material of the cover member 101 is not limited to a glass. The cover member 101 may be made of, for example, an insulating material such as an acrylic resin that can transmit visible light.

Figure 2:
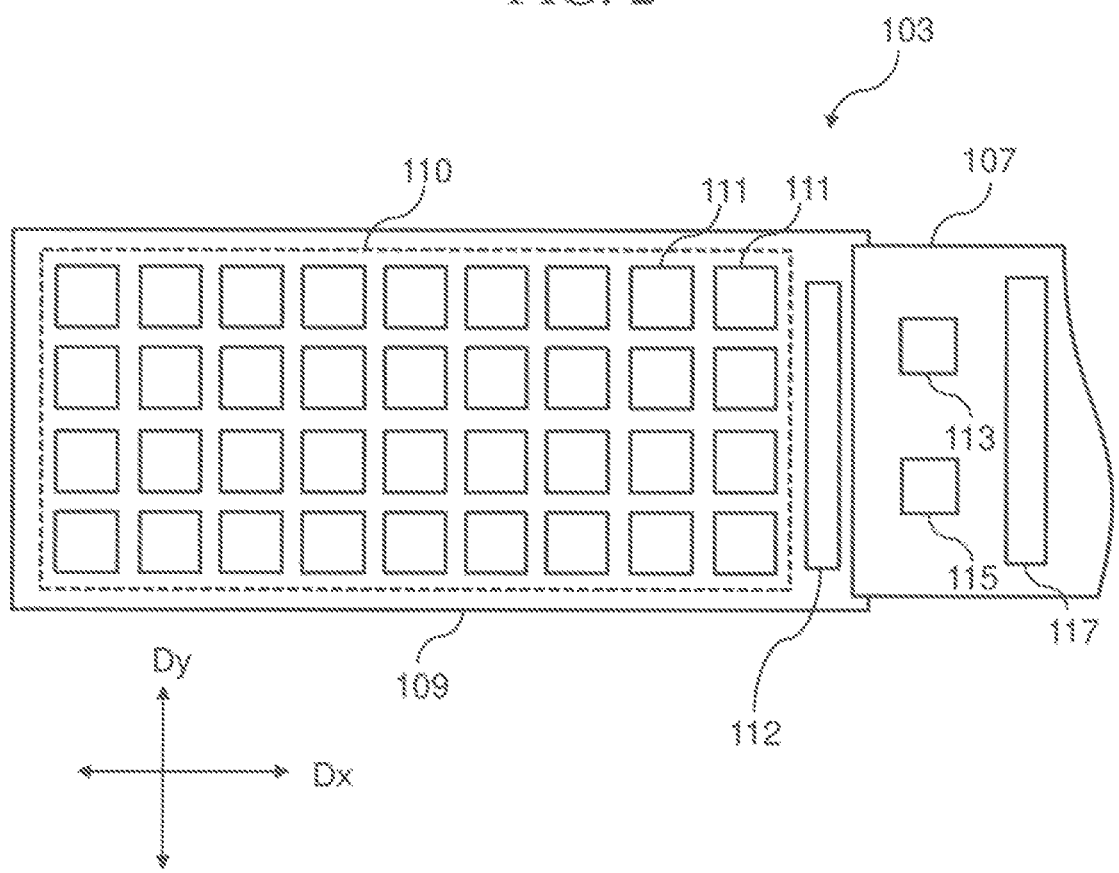
FIG. 2 is a plan view showing an example of a configuration of a first sensor array according to an embodiment.
Figure 3:
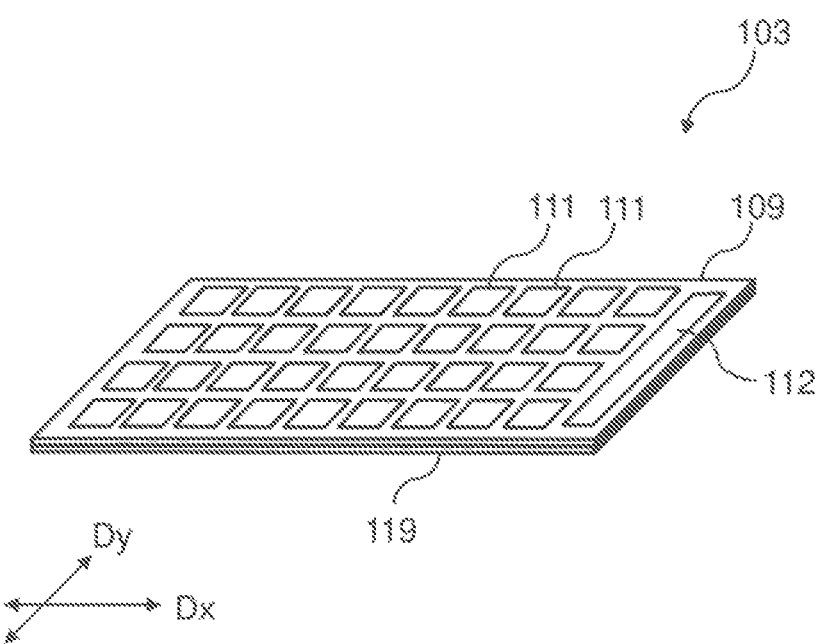
FIG. 3 is a perspective view showing an example of a configuration of a first sensor array according to an embodiment.

The first sensor array 103 is a self-capacitive and non-contact type sensor array. The first sensor array 103 is provided overlapping the cover member 101. FIG. 2 is a plan view showing an example of a configuration of the first sensor array 103. FIG. 3 is a perspective view showing an example of a configuration of the first sensor array 103. As shown in FIG. 2 and FIG. 3, the first sensor array 103 includes a substrate 109, a plurality of first sensor electrodes 111, and a voltage adjustment circuit 112. The first sensor array 103 may include a shield electrode (shield member) 119.

The substrate 109 is an insulating substrate. The substrate 109 may be a glass substrate. However, the substrate 109 is not limited to a glass substrate. The substrate 109 may be made of an insulating material capable of transmitting visible light. Examples of such an insulating material include a resin material such as polyethylene terephthalate (PET), polyethylene naphthalate (PEN), polyethylene (PE), polypropylene (PP), polystyrene (PS), vinyl-based resin, polycarbonate (PC), polyamide (PA), polyimide (PI), polyvinyl alcohol (PVA), acrylic resin, and triacetyl cellulose (TAC). The shape of the substrate 109 is not limited, and as an example, the case where the substrate 109 is a rectangular shape having sides along first direction Dx and second direction Dy perpendicular to the first direction Dx will be described.

A first detection area 110 is provided on one surface of the substrate 109. The plurality of first sensor electrodes 111 is arranged in the first detection area 110. As shown in FIG. 2 and FIG. 3, the plurality of first sensor electrodes 111 can be arranged in a matrix on the substrate 109 along the first direction Dx and the second direction Dy. FIG. 2 shows a configuration in which the plurality of first sensor electrodes 111 is arranged in a matrix of 4 rows×9 columns on the substrate 109 as an example. However, the number and arrangement of the first sensor electrode 111 are not limited to this example.

The first sensor electrode 111 may be composed of a rectangular planar pattern. The first sensor electrode 111 may have a rectangular shape of 28 mm×30 mm, for example. However, the size of the first sensor electrode 111 is not limited to this. As the size of the first sensor electrode 111 increases, the sensitivity of the first electrode 111 improves. That is, the larger the size of the first sensor electrode 111 is, the more an object to be detected can be detected away from the first sensor array 103. On the other hand, if the size of the first sensor electrode 111 is excessively large, the detection accuracy of the position of the object to be detected close to the first sensor array 103 decreases. Therefore, the size of the first sensor electrode 111 may be any size as long as it can detect the object to be detected away from the non-contact type first sensor array 103 and can specify the position of the object close to the first sensor array 103. Specifically, the first sensor electrode 111 is preferably has a size capable of detecting the object that is about 3 cm to 5 cm from the first sensor array 103. The size of the first sensor electrode 111 may be larger than the size of an electrode (drive electrode 123) provided in the drive electrode array 105 to be described later.

The first sensor electrode 111 may be composed of a transparent conductive material such as an indium tin oxide (ITO), a conductive polymer such as an PEDOT/PSS which is a thiophene-based polymer, or a metal material (mesh-layout) such as a thin metal wire. Of the plurality of first sensor electrodes 111, two adjacent first sensor electrodes 111 are electrically independent of each other.

Each of the plurality of first sensor electrode 111 is connected to the voltage adjustment circuit 112 via a wiring (not shown). A drive signal is supplied to each first sensor electrode 111 via the wiring. The drive signal may be a pulsed voltage (AC wave or square wave). When a conductor (e.g., a human finger) which is the object to be detected approaches the first sensor electrode 111, a pseudo capacitor is formed between the electrode constituting the first sensor electrode 111 and the object. Consequently, the capacitance of the first sensor electrode 111 changes. The change in the capacitance of the first sensor electrode 111 may be output as a detection signal (first detection signal). Alternatively, the magnitude of the capacitance of the first sensor electrode 111 may be output as a detection signal. The detection signal is output to the voltage adjustment circuit 112 via the wiring.

The voltage adjustment circuit 112 receives the detection signal from the plurality of first sensor electrodes 111 via the wiring. The voltage adjustment circuit 112 includes an operational amplifier (not shown) connected to each wiring. The voltage adjustment circuit 112 amplifies the input detection signal. The detection signal amplified by the voltage adjustment circuit 112 is output to the circuit substrate 107.

The shield electrode 119 may be provided on the other surface of the substrate 109. The shield electrode 119 covers substantially the entire surface on the other surface of the substrate 109 and covers an area in which all of the first sensor electrodes 111 are arranged. The shield electrode 119 is made of a transparent conductive material such as an ITO, or a conductive polymer such as an PEDOT/PSS. A predetermined voltage is applied to the shield electrode 119 at the same timing as the timing at which a predetermined voltage (drive signal) is applied to the first sensor electrode 111. The shield electrode 119 prevents a change in the capacitance of the first sensor electrode 111 due to the voltage applied to the drive electrode array 105 to be described later.

Figure 4:
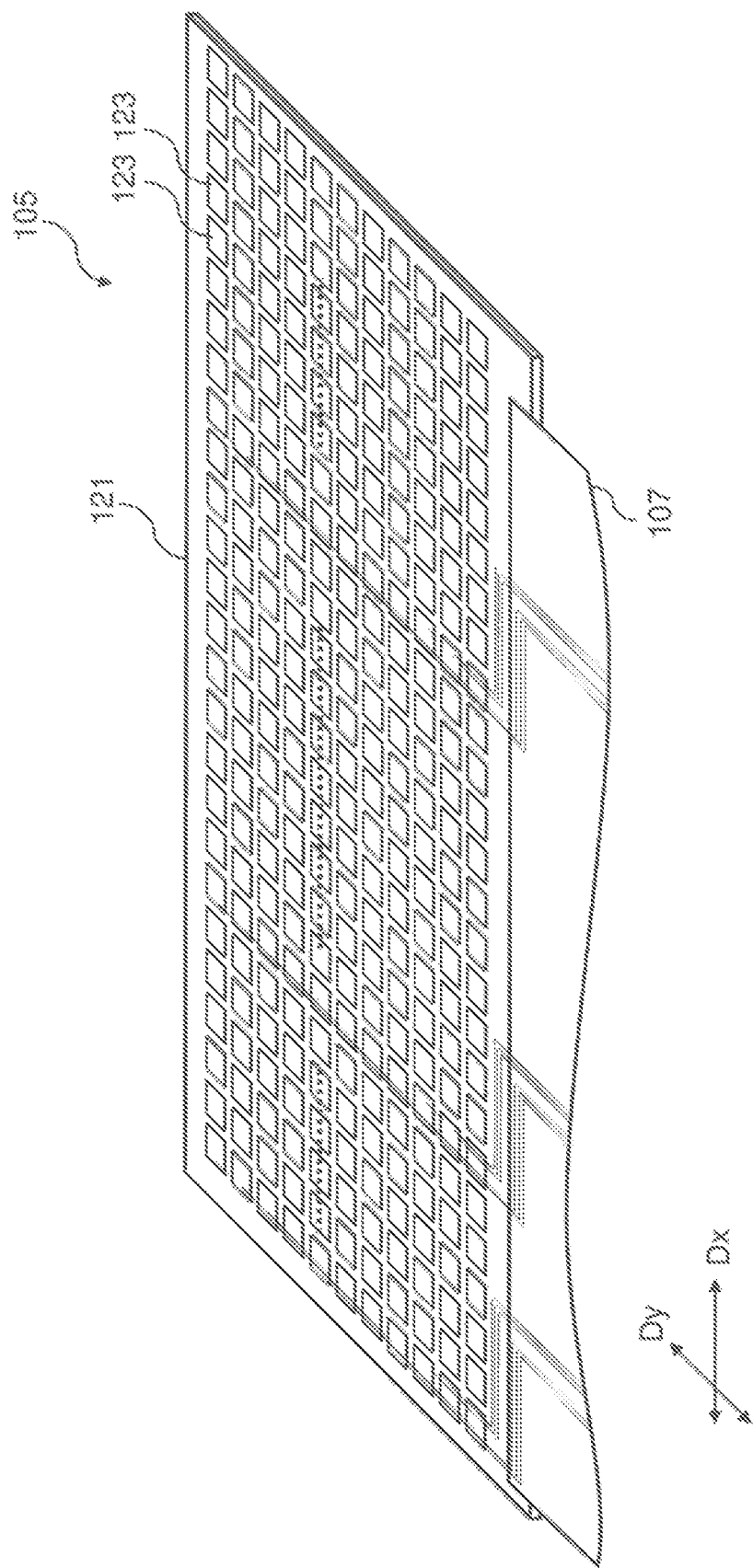
FIG. 4 is a perspective view showing an example of a configuration of a drive electrode array according to an embodiment.

FIG. 4 is a perspective view showing an example of a configuration of the drive electrode array 105. The drive electrode array 105 is provided overlapping the first sensor array 103. The drive electrode array 105 includes a substrate 121 and a plurality of drive electrodes 123.

The substrate 121 is an insulating substrate. The substrate 121 may be a glass substrate. However, the substrate 121 is not limited to a glass substrate. The substrate 121 may be made of an insulating material capable of transmitting visible light. Examples of such an insulating material include the same material as the material constituting the substrate 109. The shape of the substrate 121 is not limited, and as an example, the case where the substrate 121 is a rectangular shape having sides along the first direction Dx and the second direction Dy perpendicular to the first direction Dx will be described. The substrate 121 overlaps the substrate 109 of the first sensor array 103.

The plurality of drive electrodes 123 is provided on one surface of the substrate 121. The plurality of drive electrodes 123 is provided on a surface of the substrate 121 facing the first sensor array 103 or the second sensor module 200. The plurality of drive electrodes 123 can be arranged in a matrix on the substrate 121 along the first direction Dx and the second direction Dy. The drive electrode 123 may be composed of a rectangular planar pattern. The size of the drive electrode 123 may be smaller than the size of the first sensor electrode 111 provided on the substrate 109 of the first sensor array 103. For example, the drive electrode 123 may have a rectangular shape of 4 mm to 5 mm×4 mm to 5 mm.

The drive electrode 123 is made of a transparent conductive material such as an ITO, a conductive polymer such as PEDOT/PSS, or a metal material such as a thin metal wire (mesh-layout). Of the plurality of drive electrodes 123, two adjacent drive electrodes 123 are electrically independent of each other. Each of the plurality of drive electrodes 123 is applied the drive signal output from a drive unit (drive unit 400) to be described later via a wiring provided on the circuit substrate 107. Charges are accumulated in the drive electrode 123 to which the drive signal is applied.

As described above, the substrate 121 overlaps the substrate 109 of the first sensor array 103. The positional relationship between the plurality of first sensor electrodes 111 provided on the substrate 109 and the plurality of drive electrodes 123 provided on the substrate 121 is optional. However, as described above, when the size of the drive electrode 123 is smaller than the size of the first sensor electrode 111 of the first sensor array 103, each first sensor electrode 111 is arranged to overlap the plurality of drive electrodes 123 in a plan view.

The circuit substrate 107 may be a flexible circuit (FPC) board. The first IC element 113, the second IC element 115, and the third IC element 117 are mounted on the circuit substrate 107.

Figure 5:
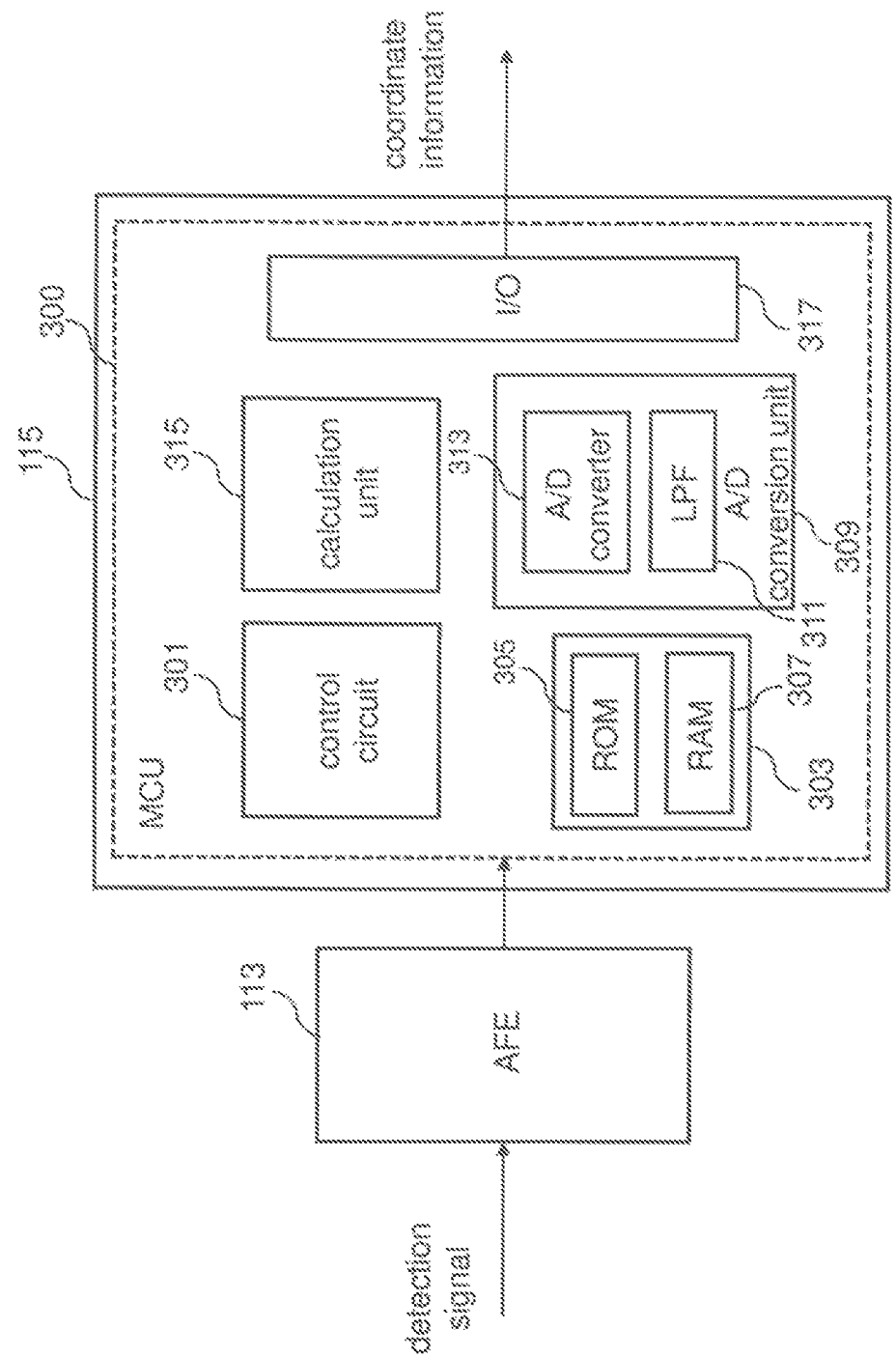
FIG. 5 is a block diagram showing an example of a configuration of a first IC element and a second IC element according to an embodiment.

FIG. 5 is a block diagram showing an example of a configuration of the first IC element 113 and the second IC element 115. The configuration of the first IC element 113 and the second IC element 115 will be described with reference to FIG. 5.

The first IC element 113 may be an IC chip including an analog front end (AFE). The detection signals output from the plurality of first sensor electrodes 111 provided in the first sensor array 103 are input to the first IC element 113 from the voltage adjustment circuit 112. The detection signal input to the first IC element 113 is adjusted by the analog front end. The adjusted detection signal is output from the first IC element 113 to the second IC element 115 via a wiring (not shown). The analog front end may be provided on the substrate 109 together with the voltage adjustment circuit 112. In this case, the first IC element 113 can be omitted.

The second IC element 115 may be a micro controller unit (MCU). The MCU of the second IC element 115 constitute a control unit 300. The control unit 300 includes a control circuit 301, a memory unit 303, an A/D conversion unit 309, a calculation unit 315, and an I/O interface 317.

The control circuit 301 executes a control program stored in a ROM 305 (to be described later) by the CPU and realizes a function of generating coordinate information indicating the position of the object to be detected based on the detection signal output from the first IC element 113.

The memory unit 303 includes the ROM 305 and a RAM 307. The ROM 305 stores various computer programs to be executed by the control circuit 301, various data to be referred to when the control circuit 301 executes a predetermined computer program, and the like in a readable manner. The RAM 307 is used as a working memory for temporarily storing various data generated when the control circuit 301 executes a predetermined computer program. The RAM 307 may also be used as a memory and the like for temporarily storing a running computer program and associated data.

The A/D conversion unit 309 includes a low-pass filter LPF 311 and an A/D converter 313. The low-pass filter 311 removes high-frequency components (noise components) included in the detection signal. The A/D converter 313 samples a noise-removed analog detection signal and converts it to a digital signal. The A/D conversion unit 309 outputs the digitized detection signal to the calculation unit 315.

The calculation unit 315 may be a logical circuit that determines presence or absence of the object to be detected close to the first sensor array 103, and further determines a position of the object on the coordinates. The calculation unit 315 determines presence or absence of the object close to the first sensor array 103 based on the digitized detection signal input from the A/D conversion unit 309. In the case where one of the first sensor electrodes 111 outputs a detection signal including a capacitance change, the calculation unit 315 determines that the object has approached the first sensor electrode 111 which has output the detection signal, and determines the position of the object on the x-y coordinates based on the position of the first sensor electrode 111. The calculation unit 315 generates coordinate information indicating the position of the object on the x-y coordinates. The coordinate information includes at least x coordinate information (first coordinate information) and y coordinate information (second coordinate information). The coordinate information may also include z coordinate information which indicates a height of the object 801 from the first sensor array 103. The calculation unit 315 transmits the coordinate information to the third IC element 117 via the I/O interface 317.

In the case where the first sensor electrode 111 outputs a detection signal including the magnitude of the capacitance, the calculation unit 315 determines whether or not the magnitude of the detected capacitance has changed from the magnitude of the previously detected capacitance. As a result of the determination, if the magnitude of the detected capacitance has changed from the magnitude of the previously detected capacitance to a predetermined change amount or more, the calculation unit 315 determines that the object to be detected has approached the first sensor electrode 111 in which the capacitance has changed, and determines the position of the object on the x-y coordinates based on the position of the first sensor electrode 111 which has output the detection signal. As a result of the determination, if the magnitude of the detected capacitance had not changed from the magnitude of the previously detected capacitance, or if the amount of change is less than the predetermined amount of change even if the capacitance has changed, the calculation unit 315 determines that the object does not approach the first sensor electrode 111 having the capacitance. Each circuit of the second IC element 115 described above may be provided on the substrate 109 together with the voltage adjustment circuit 112. In this case, the second IC element 115 can be omitted.

Figure 6:
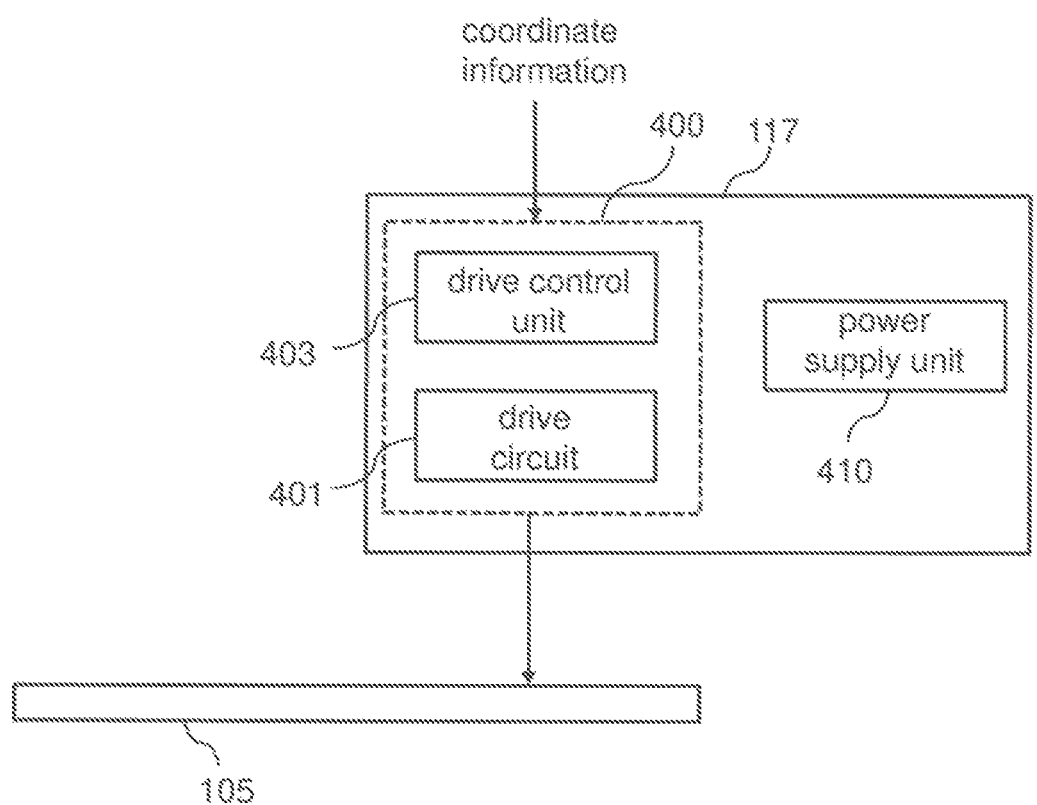
FIG. 6 is a block diagram showing an example of a configuration of a third IC device according to an embodiment.

FIG. 6 is a diagram showing an example of a configuration of the third IC element 117. The configuration of the third element 117 will be described with reference to FIG. 6. The third IC element 117 includes a drive unit 400 and a power supply unit 410.

The drive unit 400 generates a drive voltage (drive signal) for driving the drive electrode array 105 and outputs the generated drive voltage to the drive electrode array 105. The drive unit 400 includes a drive circuit 401 and a drive control unit 403.

The drive control unit 403 receives the coordinate information from the control unit 300. Based on the x-coordinate information and the y-coordinate information included in the received coordinate information, the drive control unit 403 selects at least one drive electrode 123 from the plurality of drive electrodes 123 corresponding to the x-coordinate information and the y-coordinate information. That is, the drive control unit 403 selects at least one drive electrode 123 corresponding to the coordinate of the first direction Dx corresponding to the x-coordinate information and the coordinate of the second direction Dy corresponding to the y-coordinate information from the plurality of drive electrodes 123. The drive control unit 403 may hold a table in which the x-coordinate information and the y-coordinate information and the plurality of drive electrodes 123 are associated, respectively. The drive control unit 403 may select at least one drive electrode 123 from the plurality of drive electrodes 123 associated with the x-coordinate information and the y-coordinate information included in the received coordinate information by referring to the table. The drive control unit 403 outputs a drive control signal indicating the selected drive electrode 123 to the drive circuit 401.

The drive circuit 401 generates a drive voltage (drive signal) for driving the drive electrode array 105 and outputs the generated drive voltage to the drive electrode array 105. The drive circuit 401 outputs the drive voltage to at least the one drive electrode 123 selected from the plurality of drive electrodes 123 provided in the drive electrode array 105 based on the drive control signal. The drive voltage is a fixed voltage.

As described above, the shield electrode 119 may be provided between the first sensor array 103 and the drive electrode array 105. The shield electrode 119 may prevent the capacitance of the first sensor electrode 111 from changing due to the voltage applied to the drive electrode array 105. By providing the shield electrode 119 between the first sensor array 103 and the drive electrode array 105, it is possible to minimize the influence of the drive electrodes 123 to the first sensor electrodes 111 even in the case where the drive voltage applied to the drive electrode 123 of the drive electrode array 105 is large enough to cause a change in the capacitance of the first sensor electrode 111 or in the case where a gap between the first sensor array 103 and the drive electrode array 105 is small.

Figure 7:
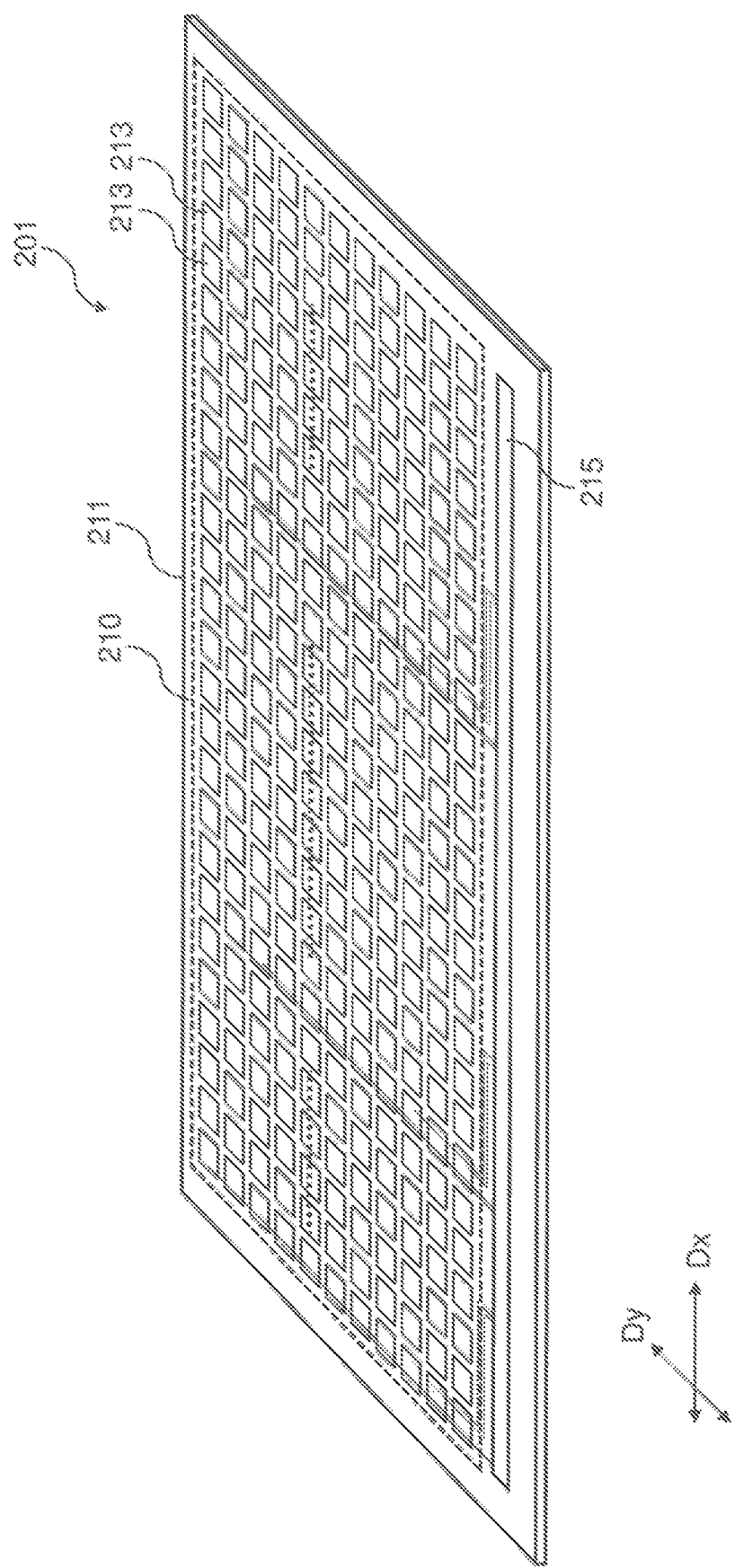
FIG. 7 is a perspective view showing an example of a configuration of a second sensor array according to an embodiment.

Next, a configuration of the second sensor module 200 will be described with reference to FIG. 1 and FIG. 7.

As shown in FIG. 1, the second sensor module 200 is provided overlapping the first sensor module 100. The second sensor module 200 includes a second sensor array 201 and a cover member 203. A configuration in which the first sensor module 100 overlaps the second sensor module 200 without passing through the cover member 203 can also be employed.

The second sensor array 201 is a capacitive self-capacitive sensor array. FIG. 7 is a perspective view showing an example of a configuration of the second sensor array 201. The second sensor array 201 includes a substrate 211, a voltage adjustment circuit 215, and a plurality of second sensor electrodes 213.

The substrate 211 may be a glass substrate. The substrate 211 is an insulating substrate. The substrate 211 may be a glass substrate. However, the substrate 211 is not limited to a glass substrate. The substrate 211 may be made of an insulating material capable of transmitting visible light. Examples of such an insulating material include the same material as the material constituting the substrate 109. The shape of the substrate 211 is not limited, and as an example, the case where the substrate 211 is a rectangular shape having sides along the first direction Dx and the second direction Dy perpendicular to the first direction Dx will be described. The substrate 211 overlaps the substrate 121 of the drive electrode array 105.

A second detection area 210 is provided on one side of the substrate 211. The plurality of second sensor electrodes 213 is provided in the second detection area 210. The second detection area 210 is provided to overlap the first detection area 110 provided on the substrate 109 of the first sensor array 103 via the drive electrode array 105. As shown in FIG. 7, the plurality of second sensor electrodes 213 can be arranged in a matrix on the substrate 211 along the first direction Dx and the second direction Dy. The positional relationship between the second sensor electrode 213 and the plurality of drive electrodes 123 provided on the substrate 121 of the drive electrode array 105 preferably corresponds to one-to-one.

The second sensor electrode 213 may be composed of a rectangular planar pattern. The second sensor electrode 213 is made of a transparent conductive material such as an ITO, a conductive polymer such as PEDOT/PSS, or a metal material such as a thin metal wire. The two adjacent second sensor electrodes 213 of the plurality of second sensor electrodes 213 are electrically independent of each other.

Each of the plurality of second sensor electrodes 213 is connected to the voltage adjustment circuit 215 via a wiring. Each of the plurality of second sensor electrodes 213 is supplied with a drive signal via the wiring. The drive signal may be a pulsed voltage. When the drive signal is applied to the drive electrode 123 in the drive electrode array 105, a pseudo capacitor is formed between the drive electrode 123 and one of the second sensor electrodes 213 facing the drive electrode 123. Consequently, the capacitance of the second sensor electrode 213 changes. The change in the capacitance of the second sensor electrode 213 may be output as a detection signal (second detection signal). Alternatively, the magnitude of the capacitance of the second sensor electrode 213 may be output as the detection signal. The detection signal is output to the voltage adjustment circuit 215 via a wiring.

The detection signal output from the second sensor electrode 213 is transmitted to the voltage adjustment circuit 215 via a wiring. The voltage adjustment circuit 215 includes an operational amplifier (not shown). The voltage adjustment circuit 215 amplifies the input detection signal and outputs the amplified detection signal to the detection circuit. The detection circuit may be provided on the substrate 211 together with the voltage adjustment circuit 215. The detection circuit detects the position of the second sensor electrode 213 where a change in capacitance has occurred based on the detection signal. The detection method is substantially the same as the detection method executed in the first IC element 113 and the second IC element 115 described referring to FIG. 5. The position where a conductor as the object to be detected has approached is specified by detecting the position of the second sensor electrode 213 where the change in capacitance occurs.

The cover member 203 may be a glass film. However, the material of the cover member 203 is not limited to a glass. The cover member 203 may be made of, for example, an insulating material such as an acrylic resin capable of transmitting visible light.

[Operation of Touch Panel]

Figure 8:
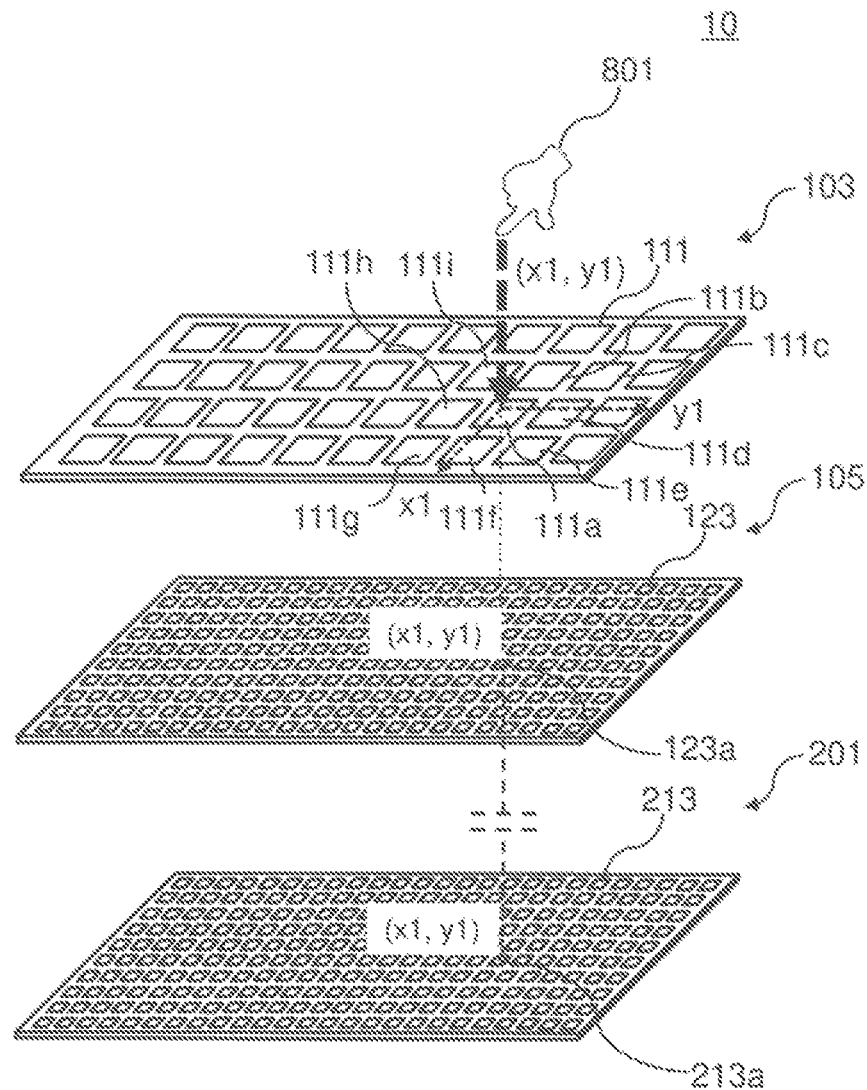
FIG. 8 is a schematic view for explaining an example of an operation of a touch panel according to an embodiment.

Next, an operation of the touch panel 10 will be described with reference to FIG. 8. FIG. 8 is a schematic view for explaining an example of an operation of the touch panel 10. The circuit substrate 107 is not shown in FIG. 8.

When an object to be detected 801 comes close to the first sensor array 103 of the first sensor module 100, the capacitances of a first sensor electrode 111a came close to the object 801 and first sensor electrodes 111b to 111i around the first sensor electrode 111a change. Each of the first sensor electrodes 111a to 111i outputs the detection signal (first detection signal) depending on the change in the capacitance.

The detection signals are input to the first IC element 113 and passes through the AFE and are output to the second IC element 115. The control unit 300 of the second IC element 115 calculates the coordinates of the object 801 by the calculation unit 315 based on the input detection signals, in other words, the control unit 300 calculates the coordinates based on the change amounts of the capacitances of the first sensor electrodes 111a to 111i which have output the detection signals and the positions of each first sensor electrode 111a to 111i, and determines the position of the object to be detected 801 on the x-y coordinates. In this case, the position of the object 801 on the x-y coordinates is defined as (x1, y1). The control unit 300 generates coordinate information indicating the determined position (x1, y1) of the object 801 on the x-y coordinates. The coordinate information is output from the control unit 300 to the third IC element 117.

The coordinate information is input to the drive unit 400 of the third IC element 117. The drive control unit 403 selects at least one drive electrode 123 to be applied the drive voltage from the drive unit 400 based on the coordinate information. The following describes the case where the drive control unit 403 selects at least one drive electrode 123a corresponding to the x-coordinate information and the y-coordinate information from the plurality of drive electrodes 123 based on the x-coordinate information and the y-coordinate information included in the coordinate information. The drive electrode 123a is located at a position corresponding to the position (x1, y1) on the x-y coordinates where the object 801 exists above the drive electrode 123a.

Further, the drive unit 400 generates a drive voltage for driving the drive electrode array 105 and outputs the generated drive voltage to the drive electrode 123a selected based on the coordinate information.

When the drive voltage is applied to the drive electrode 123a, the drive electrode 123a is charged, and a pseudo capacitor is formed between the drive electrode 123a and the second sensor electrode 213a among the plurality of second sensor electrodes 213 provided in the second sensor array 201. As a result, the capacitance of a second sensor electrode 213a changes. The change in the capacitance of the second sensor electrode 213a is output as the detection signal (second detection signal). Similar to the drive electrode 123a, the second sensor electrode 213a is provided at a position corresponding to the position (x1, y1) on the x-y coordinates where the object 801 exists above.

As described above, in the present embodiment, a predetermined drive voltage is applied to at least one drive electrode 123 of the drive electrode array 105 corresponding to the position (x1, y1) on the x-y coordinates where the object 801 is located. Then, a pseudo capacitor is formed between the drive electrode 123, to which a drive voltage is applied, instead of the object 801 and the second sensor electrode 213 provided in the second sensor array 201 of the second sensor module 200. The capacitance changes in the pseudo capacitor here is the same as the capacitance change when the object 801 directly touches the second sensor electrode 213 (or the second detection area 210). As a result, the position of the object 801 in the second detection area 210 is identified even though the object 801 is not touching the second detection area 210 of the second sensor array 201. Therefore, in the present embodiment, unlike a conventional capacitive touch panel, the second sensor module 200 can be operated without the object directly touching the second sensor module 200. That is, a user can obtain the same effects as directly touching the second detection area 210 without directly touching the second detection area 210.

In the case where the existing capacitive touch panel applied to an ATM, an automatic checkout machine, a ticket vending machine, or the like is the second sensor module 200, the configuration of the touch panel 10 of the above-described embodiment can be realized only by mounting the first sensor module 100 of the present embodiment on the second sensor module, and further connecting the units related to the drive control of each other as necessary, and there is no need to replace an existing system or change the device itself constituting a display unit. Therefore, the first sensor module 100 of the present embodiment is applied to the existing system, and a non-contact type touch panel can be easily realized.

The addition, deletion, or design change of components, or the addition, deletion, or condition change of process as appropriate by a person skilled in the art based on the above-described embodiment are also included in the scope of the present disclosure as long as they are provided with the gist of the present disclosure.

Even if the effect is different from those provided by the above-described embodiments, the effect obvious from the description in the specification or easily predicted by a person skilled in the art is apparently derived from the present disclosure.

What is claimed is:

1. A touch panel comprising:
a first sensor module; and
a second sensor module overlapping the first sensor module;
the first sensor module comprising:
a cover member;

a first sensor array overlapping the cover member, the first sensor array including a first detection area equipped with a plurality of first sensor electrodes, the first sensor array being a non-contact type;

a control unit receiving a first detection signal output from the first sensor array and generating coordinate information based on the first detection signal;

a drive unit receiving the coordinate information from the control unit and outputting a drive signal based on the coordinate information; and a drive electrode array being driven based on the drive signal and including a plurality of drive electrodes, the drive signal being applied to at least one of the drive electrodes, the at least one corresponding to a coordinate included in the coordinate information, the second sensor module comprising:

a second sensor array including a second detection area, the second detection area being arranged to overlap the first detection area via the drive electrode array, the second detection area being equipped with a plurality of second sensor electrodes, the second sensor array identifying a position corresponding to the coordinate information in the second detection area based on the drive signal supplied to the drive electrode array, wherein the plurality of drive electrodes of the drive electrode array and the plurality of second sensor electrodes face each other one-to-one.

2. The touch panel according to claim 1, wherein
the coordinate information includes first coordinate information indicating a coordinate in a first direction, and second coordinate information indicating a coordinate in a second direction different from the first direction,
the drive signal is output based on the first coordinate information and the second coordinate information, and
the at least one of the drive electrodes corresponds to the coordinate in the first direction corresponding to the first coordinate information and the coordinate in the second direction corresponding to the second coordinate information.

3. The touch panel according to claim 2, wherein the second sensor array identifies the position in the second detection area based on a change in capacitance of at least one of the plurality of second sensor electrodes opposite a drive electrode to which the drive signal is applied among the plurality of drive electrodes.

4. The touch panel according to claim 3, wherein the at least one of the plurality of second sensor electrodes opposite the drive electrode to which the drive signal is applied outputs a second detection signal which indicates a change in the capacitance or a magnitude of the capacitance.

* * * * *